United States Patent [19]

Germain

[11] Patent Number: 4,969,686
[45] Date of Patent: Nov. 13, 1990

[54] PIVOTING CENTRAL ARMREST FOR MOTOR-VEHICLE SEAT

[75] Inventor: Gérard Germain, Montbeliard, France

[73] Assignees: Automobiles Peugeot, Paris; Automobiles Citroen, Neuilly Seine, both of France

[21] Appl. No.: 369,852

[22] Filed: Jun. 22, 1989

[30] Foreign Application Priority Data

Jun. 22, 1988 [FR] France .................................. 88 08390

[51] Int. Cl.⁵ .............................................. A47C 7/54
[52] U.S. Cl. ..................................... 297/417; 297/113
[58] Field of Search ............... 297/364, 365, 373, 408, 297/417, 112, 113, 115

[56] References Cited

U.S. PATENT DOCUMENTS 4,266,760  5/1981  Matsui et al. ................... 297/408 X

FOREIGN PATENT DOCUMENTS 0061967 10/1982 European Pat. Off. .
2932347  2/1981 Fed. Rep. of Germany ...... 297/417
3335497  5/1985 Fed. Rep. of Germany ...... 297/408
1244382  9/1960 France ................................. 297/373
2287193 10/1975 France .
131331  7/1985 Japan ................................... 297/417

Primary Examiner—Peter R. Brown
Attorney, Agent, or Firm—Burns, Doane, Swecker & Mathis

[57] ABSTRACT

The horizontal hinging pin (2) integral with the structure of the vehicle has a keeper (8) of annular shape having a profiled active surface (8a). The movable part (3) of the armrest comprises an operating assembly (22) mounted slidably on the frame of the armrest in the axial direction XX'. The operating assembly comprises a bolt (21) having an actuating surface comprising fingers (23) cooperating with the active surface (8a) of the keeper (8) in order to ensure locking of the armrest in a raised position. Unlocking of the armrest may be obtained by pushing a button (18) causing axial displacement of the operating assembly (22) and of the blocking finger (23) of the bolt (21). The armrest may be made to return into its lowered position by an elastic return member such as a spring.

10 Claims, 4 Drawing Sheets

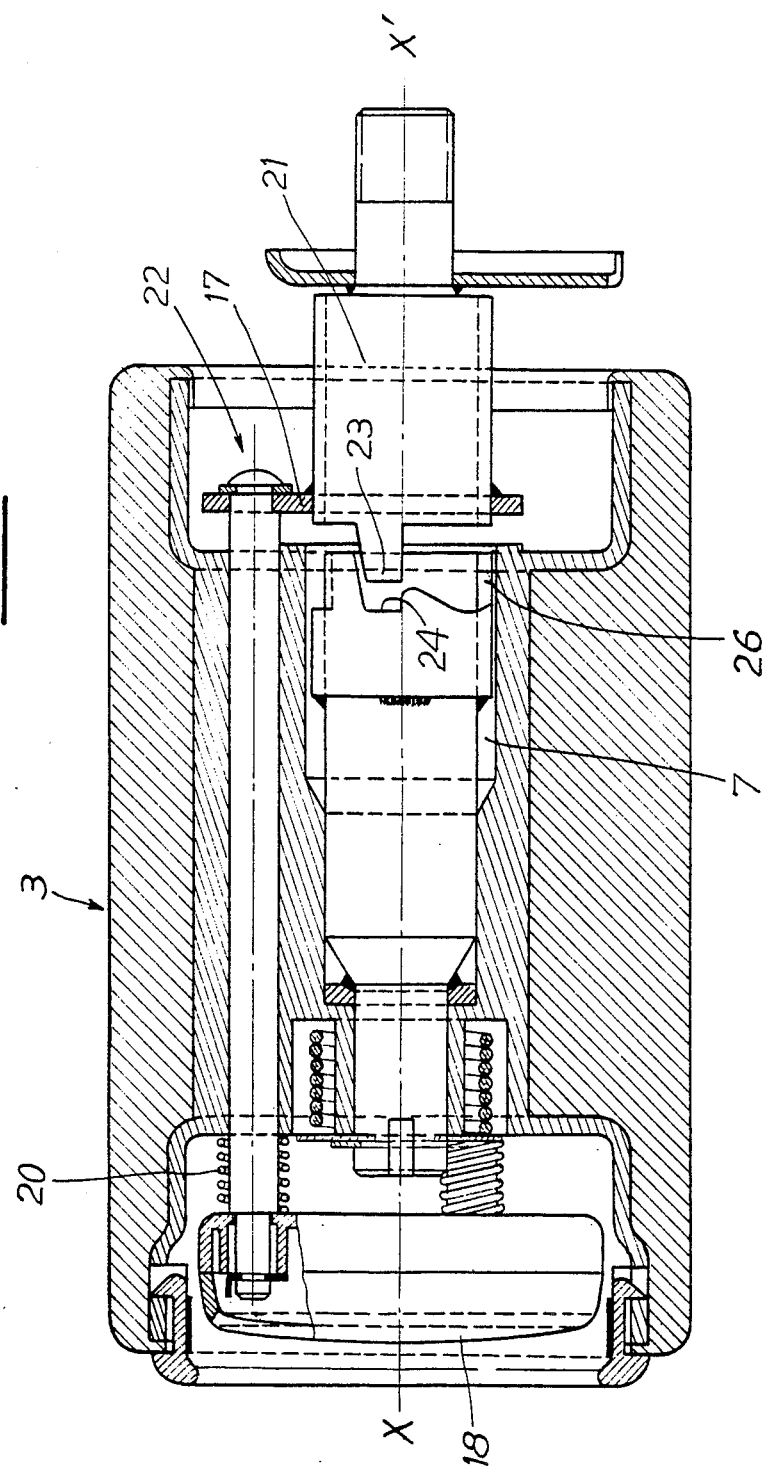

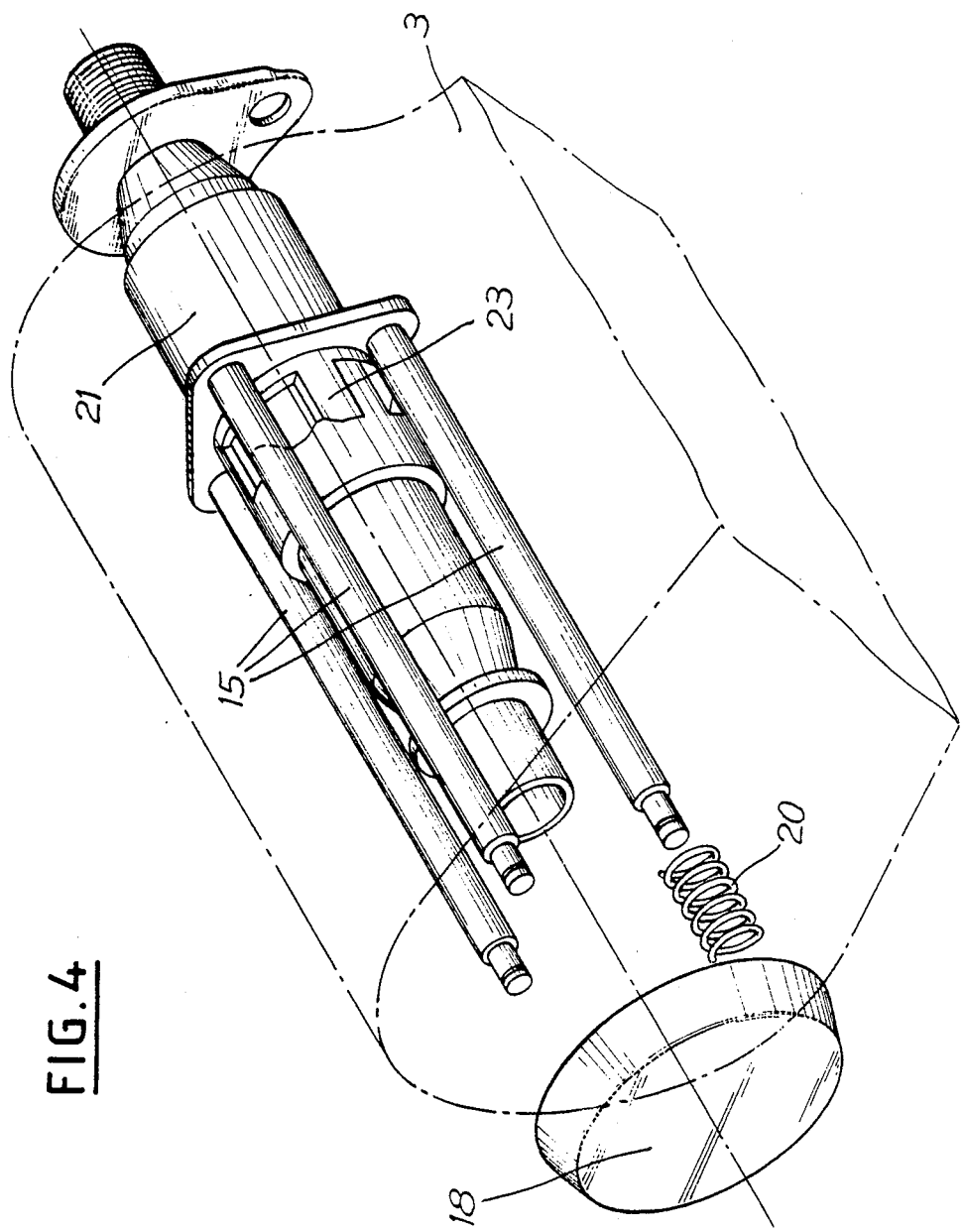

PIVOTING CENTRAL ARMREST FOR MOTOR-VEHICLE SEAT

The invention relates to an armrest, in particular a front central armrest of a motor vehicle, having two stable positions.

The front central armrest of a motor vehicle which is arranged between the two front seats comprises a movable support part consisting of a frame covered by padding. This movable part is mounted hingeably on the motor vehicle, about a horizontal pin, so as to be able to move between two position, namely a lowered position where this movable support part is substantially horizontal and a raised position where it is substantially vertical. In its lowered position, the armrest performs it usual function, it being necessary on some occasions to arrange the armrest in its raised position in order to be able to gain access to a zone situated underneath the armrest, reserved for various uses. It is possible, for example, to arrange underneath the armrest a box or case for storing various objects which may be of use to the driver or the passengers of the vehicle. It is also possible to arrange underneath the armrest a control panel comprising means for operating various components of the vehicle.

In the case of a fixed armrest remaining constantly in a substantially horizontal position, it is not possible to define ideal dimensions for this armrest which enable both good accessibility to the zone situated underneath the armrest and satisfactory comfort for the front passenger of the vehicle to be obtained. Moreover, the fixed-position armrest does not constitute an effective barrier between the rear and the front of the vehicle, in the space formed between the two front seats.

It may in fact be necessary to form such a barrier between the rear and the front of the vehicle, for example in order to prevent a child or an animal passing from the rear to the front of the vehicle. Such a barrier may also prevent a child sitting on the rear seat of the vehicle from being thrown towards the front of the vehicle in the event of sudden braking.

It has therefore been proposed to provide a means for locking the front central armrest in the raised position, so that this armrest is thus able to form an effective barrier between the rear and the front of the vehicle.

It has been proposed to perform locking and unlocking of the armrest by means arranged laterally relative to the armrest. However, such means are impractical and bulky.

Also, the patent application FR-A-87-08881 has proposed an armrest, the movable part of which is hinged on a clevis fixed on the body of the vehicle and comprising two vertical uprights. A locking pin is mounted with a certain latitude of displacement on the movable part. This locking pin cooperates with the uprights of the clevis, in particular in order to perform locking in rotation of the armrest in the vertical position. Unlocking of the armrest allowing its return towards the lowered position is obtained by exerting manually a pulling force on the locking pin. The movable part of the armrest may be moved between its lowered position and its raised position manually.

Such a device which enables an effective barrier to be formed between the rear and the front of the vehicle requires that a clevis be fixed onto the body of the vehicle, which, in certain cases, may constitute a drawback.

The object of the invention, therefore, is to propose an armrest, in particular a front central armrest of a motor vehicle comprising a movable part consisting of a frame covered by padding mounted pivotably about a horizontal hinging pin so as to be able to be moved between two stable positions, namely a lowered position where the movable part is substantially horizontal and a raised position where it is substantially vertical, this armrest operating in a very simple and very reliable manner and being capable of being mounted equally well on the body or on a front seat of the vehicle, To this end:

the horizontal hinging pin integral with the structure of the vehicle comprises a keeper of annular shape arranged coaxially relative to the hinging pin, having a profiled active surface along an annular edge, at one of its front ends, around the hinging pin, and the movable part comprises an operating assembly consisting of a support mounted slidably on the frame in the axial direction carrying an annular-shaped bolt mounted slidably on the hinging pin and having a profiled active surface along an annular edge capable of cooperating with the active surface of the keeper in order to lock the part movable in rotation in its vertical position and place this movable part in abutment downwards in its horizontal position and an operating button accessible on a lateral side of the armrest for axial displacement of the support and of the bolt by means of pushing, in order to perform unlocking of the movable part in the vertical position, by separation of the bolt and of the keeper, elastic return means being inserted between the operating assembly and the frame, so as to ensure the return of the bolt towards the keeper.

So that the invention may be properly understood, a description is now given, by way of non-limiting examples, with reference to the appended drawings, of an embodiment of a front central armrest for a vehicle seat, according to the invention.

FIG. 3 is a sectional view, similar to FIG. 2, of the armrest in the raised position and at the start of unlocking.

FIG. 4 is a partial, exploded, perspective view of the armrest in the low position.

Figure 1:
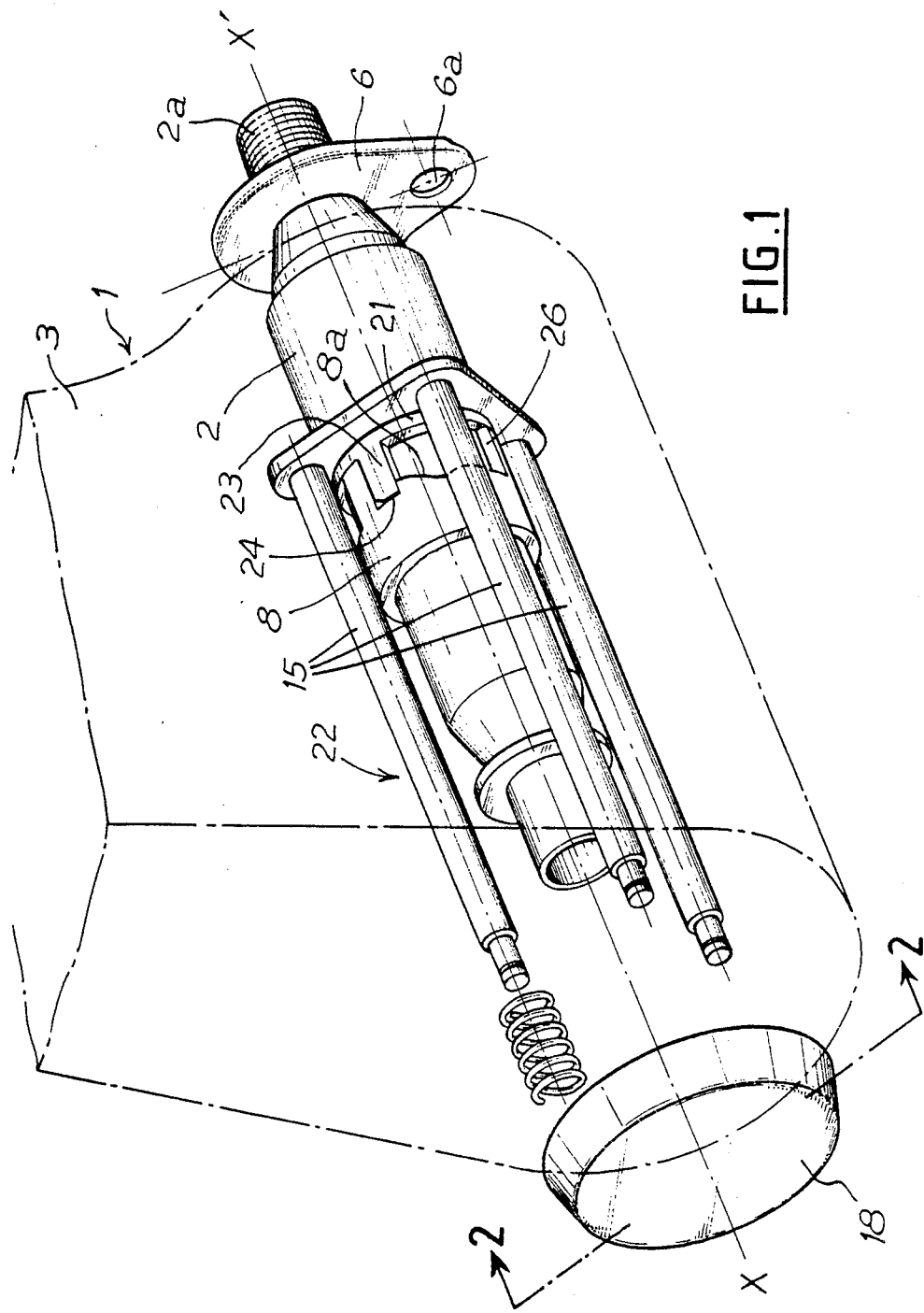
FIG. 1 is a partial, exploded, perspective view of the armrest locked in a raised position.
Figure 2:
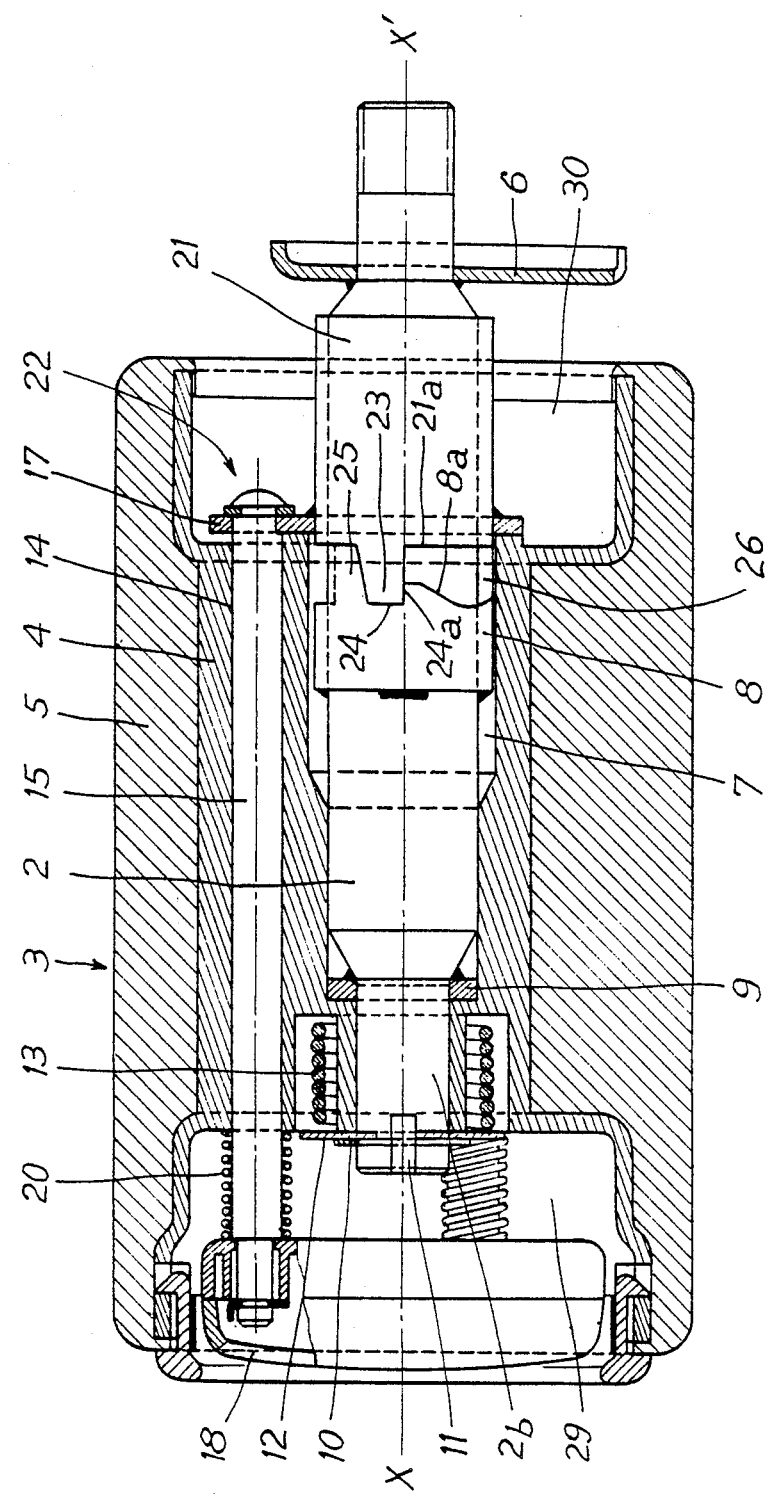
FIG. 2 is a sectional view of the armrest along 2—2 of FIG. 1.

FIGS. 1 and 2 show a front central armrest of a motor vehicle indicated generally by the reference 1 and comprising a fixed part consisting of a hinging pin 2 and a movable part 3 mounted pivotably on the hinging pin 2, about the geometric axis of rotation XX'.

The hinging pin 2 comprises a threaded end 2a and, in the vicinity of this end, a plate made of folded sheet-metal 6 pierced by a fixing hole 6a and fixed by means of welding to the end of the pin 2.

The hinging pin 2 symmetrical in revolution about the geometric axis XX' is fixed on the structure of the vehicle, such that the geometric axis of rotation XX' is horizontal.

Preferably, the hinging pin 2 is fixed on the right-hand edge of the backrest of the driver's seat, in the bottom part thereof. For this purpose, a tapped hole is provided in the frame of the seat, into which the threaded part 2a of the hinging pin 2 is screwed. The pin 2 is then locked in rotation and fixed in position by means of a fixing screw engaged inside the hole 6a of the plate 6 and screwed into the frame of the driver's seat.

As can be seen in FIG. 2, the movable part 3 of the armrest 1 comprises a rigid frame and flexible padding 5 covering the frame.

The rigid frame 4 comprises a central bore 7 inside which there is mounted the hinging pin 2, such that the movable part 3 of the armrest is able to pivot between a raised position as shown in FIG. 1 and a lowered position shown in FIG. 4.

The hinging pin 2 carries a keeper 8 consisting of a piece of annular shape threaded on the pin 2 and fixed by means of welding on the pin 2. The keeper 8 comprises a profiled active surface 8a at one of its front ends, the precise shape of which will be described below.

The hinging pin 2 may be advantageously made in tubular form and made, in this case, by welding of different tubular parts one on top of the other. This hinging pin could also be made in solid form by simple machining. In this case, however, it is preferable to make the keeper in the form of a separate part mounted by means of welding on the hinging pin.

The bore 7 of the frame 4 has successive parts in the axial direction, the diameters of which are different and which enable the different parts of the hinging pin 2 to be accommodated.

The hinging pin 2 comprises a shaft end 2b with a reduced diameter at its end opposite to the threaded part 2a which is engaged in a corresponding part of the bore 7, with a reduced diameter. A locking washer 9 is welded onto the pin 2 at the internal end of the shaft end 2b. This washer 9 bears against a shoulder of the bore 7 of the frame 4 separating the small-diameter part of the bore 7 inside which the shaft end 2b is engaged from a part with a larger diameter inside which the central part of the hinging pin 2 is mounted.

A stop ring or a circlip 10 engaged over the external end of the shaft end 2b and bearing against a washer 12 of larger diameter, itself bearing against the end of the frame 4, enables axial holding of the frame 4 and of movable assembly 3 of the armrest mounted on the pin 2 to be ensured.

The washer 12 is locked in rotation on the shaft end 2b by a key 11.

One of the ends of a return spring 13 is engaged inside an opening of the washer 12, enabling it to be fixed in a position set and indexed in rotation about the axis XX'. The other end of the return spring 13 is fixed onto the frame 4. The frame 4 is mounted with slight friction on the hinging pin 2, such that it is capable of pivoting about the axis XX'. The spring 13 ensures the return of the movable part 3 of the armrest into a position which corresponds to the lowered horizontal position of this armrest, as will be explained below.

The bore 7 of the frame 4 comprises a part with a large diameter inside which the keeper 8 is engaged, with a certain amount of radial play.

The frame 4 comprises, in the direction of the axis XX', i.e. along the width of the armrest, rectilinear cylindrical holes such as the hole 14 shown in FIG. 2, passing through the frame 4 from one side to the other.

Inside each of the holes 14 there is slidably engaged a rod 15, the ends of which protrude relative to the hole 14.

In FIG. 1 it can be seen that three rods 15 parallel to the axis XX' are arranged substantially at 120° around the axis XX' and joined at their ends to a plate 17 so as to form an assembly mounted slidably on the frame 4, in the direction XX'. For this purpose, each of the rods 15 is engaged inside a corresponding hole 14 passing through the frame 4 in the transverse direction.

The ends of the rods 15 joined to the plate 17 are engaged inside holes passing through this plate and placed in abutment and fixed in position by a screw and a washer.

The end of the rods 15 opposite the end fixed onto the plate 17 are joined to an operating button 18 made of plastic material which is clipped onto the end of the rods. A return spring 20 is engaged over the end of each of the rods 15 before the button 18 is clipped on, such that these springs 20 are inserted between the frame 4 and the button 18.

The plate 15 comprises a central opening of axis XX' inside which there is fixed by means of welding a bolt 21 of annular shape inserted on the hinging pin 2 and mounted slidably on this pin.

The assembly 22 consisting of the rods 15, the plate 17 and the button 18 forms an assembly for operating the bolt 21, capable of moving in the axial direction relative to the frame 4, when a pushing force is exerted on the button 18. The bolt 21 is thus subjected to an axial displacement from the left to the right.

The springs 20 are compressed and ensure the return of the operating assembly into its position shown in FIG. 2, when the pressure on the button 18 is released.

The bolt 21 comprises an active annular surface 21a at its front end directed towards the inside of the armrest, i.e. towards the active surface 8a of the keeper 8.

The active front end of the bolt 21 comprises two axially protruding locking fingers arranged substantially at 180° on the bolt 21. These locking fingers such as the finger 23 shown in FIG. 2 each comprise a lateral engaging surface substantially inclined relative to the axial direction and a lateral locking surface substantially parallel to the axis XX'.

The actuating surface 8a of the keeper 8, one half of which can be seen in FIGS. 1 and 2, comprises a notch 24 slightly re-entrant towards the inside, with a shape corresponding to the shape of the finger 23 of the bolt 21 and delimited on one side by an axially projecting part 25 of the keeper 8. The keeper 8 comprises two notches 24 situated at 180° from each other and therefore two projecting parts 25 at 180°, if a rotation about the axis XX' is considered.

Each of the projecting parts 25 defines, on one of its lateral sides inclined relative to the axis XX', the edge of the notch 24 allowing engagement of the finger 23 and, on its other side parallel to the axis XX', a stop 26.

The notch 24 is delimited, opposite the projecting part 25, by a raised edge 24a of limited length, parallel to the axis XX. Between the edge 24a and the stop 26, the active surface 8a of the keeper forms a ramp initially directed towards the inside of the armrest and then towards the outside, i.e. in a direction corresponding to displacement, towards the right, of the operating assembly 22 and to compression of the springs 20, when the finger 23 of the bolt 21 cooperates with this ramp.

The keeper 8 comprises a second similar ramp arranged at 180° with which the second finger 23 of the bolt 21 is capable of cooperating.

As can be seen in FIG. 2, the frame 4 comprises two lateral ends defining two cavities 29 and 30 open towards the outside of the armrest.

The parts of the operating assembly 22 situated outside the openings 14 passing through the frame 4 are arranged inside the cavities 29 and 30. The operating button 18, the ends of the rods 15 fixed inside the stopper 18 and the springs 20 are arranged inside the cavity 29, such that access can be easily gained to the button 18 from the outside in order to operate it by means of pushing, from the front passenger seat.

The plate 17 and the ends of the corresponding rods 15 as well as the bolt 21 are engaged inside the cavity 30 situated on the driver seat side onto which the hinging pin 22 of the armrest is fixed. The cavities 29 and 30 allow sufficient clearance for the assembly 22 so that the armrest can be operated.

In FIGS. 3 and 4, the armrest has been shown in configurations or positions different from those shown in FIGS. 1 and 2. The correspondiong elements in FIGS. 1 and 2 on the one hand and 3 and 4 on the other hand have the same references. In FIGS. 1 and 2 the armrest has been shown in its raised position, the movable assembly 3 being in a practically vertical position.

The armrest is locked in this position by engagement of the fingers 23 of the bolt 21 inside the notches 24 of the keeper 8, under the action of the springs 20 which ensure the return of the assembly 22 into its position situated towards the left end of the bolt 21 integral with this assembly 22, into its position of engagement with the keeper 8.

The armrest thus forms a barrier between the rear and the front of the vehicle.

In order to swing down the armrest into its lowered substantially horizontal position shown in FIG. 4, the operating assembly 22 is actuated by exerting a pushing pressure on the button 18, as shown in FIG. 3. This pushing force produces compression of the springs 20 and displacement of the assembly 22 and of the bolt 21 towards the right, such that the fingers 23 move away from the bottom of the notches 24, as shown in FIG. 3. The end of the finger 23 assumes a position situated beyond the raised edge 24a, such that the movable part 3 of the armrest is free in rotation about the axis XX'. The return spring 13 starts to bias the movable part 3 of the armrest downwards and the pressure on the button 18 is released. The assembly 22 moves towards the left, such that the end of the finger 23 comes into contact with the ramp of the active part 8a of the keeper. The downward movement of the armrest continues without difficulty, since the ramp is directed towards the inside of the armrest, i.e. in a direction corresponding to release of the springs 20 previously compressed.

The end part of the ramp of the active surface 8a is directed in the other direction, i.e. in a direction causing displacement of the bolt 21 and of the operating assembly 22 causing compression of the springs 20. This results in braking and slowing down of the armrest before the bearing surface of the finger 23 comes into abutment against the bearing surface 26 of the finger 25 of the keeper. The armrest is therefore brought to a standstill by the stop surface 26, after an end-of-travel slowing down movement. In this position, the armrest is substantially horizontal, as shown in FIG. 4.

In this position, the bolt 21 and the finger 23 are made to return towards the left by the springs 20, such that the end of the finger 23 is in contact with the bottom part of the ramp of the surface 8a.

To effect raising of the armrest from this horizontal position, it is sufficient to lift its end part opposite the hinging pin 2. The fingers 23 of the bolt 21 remain in contact with the corresponding ramps of the surface 8a during rotation of the movable part 3 and of the operating assembly 22 about the axis XX'.

At the end of movement, the inclined lateral surface of the finger 23 comes into contact with the corresponding inclined surface delimiting the notch 24 of the keeper. The pivoting movement cannot continue and the finger 23 is guided inside the notch 24 inside which it engages. The bolt 21 thus immobilizes the part 3 of the armrest.

The parts have returned into their position shown in FIGS. 1 and 2.

During pivoting, the second part of the ramp of the active surface 8a directed towards the outside of the armrest causes displacement of the bolt 21 and of the assembly 22 towards the right and therefore compression of the springs 20. The compressed springs 20 ensure engagement of the finger 23 into the notch 24, when the armrest has reached its raised position.

The displacement by means of pivoting of the armrest between its lowered horizontal position and its raised position also enables the spring 13 of the movable part 3 of the armrest to be tensioned in the lowered position.

The angular clearance of the movable part of the armrest corresponding to the angle of rotational displacement of the finger 23 of the bolt 21 between the cavity 24 and the stop 26 is equal to 116° in the example of embodiment which has been described. Starting from a practically horizontal position of the armrest, this armrest therefore assumes a raised position where it is slightly inclined towards the rear.

The armrest according to the invention therefore operates in a very simple and reliable manner, being kept in a raised position by positive locking of a finger inside a notch and being kept in a lowered position by bearing against a bottom stop. Moreover, unlocking of the armrest into the raised position is obtained in a very simple manner by pushing on an easily accessible button, the downward movement of the armrest then being performed automatically by a return means.

Moreover, the armrest according to the invention does not comprise a part projecting towards the outside and may be fixed equally well on a seat or on another part of the structure of the vehicle.

The armrest is furthermore locked totally automatically, when it reaches a high position.

The invention is not limited to the embodiment which has been described.

Thus the support of the operating assembly may consist of a number of parallel rods other than three or in any other form. In the case where it consists of rods mounted slidably inside the frame of the movable part of the armrest, it is necessary to provide at least two rods in order to obtain an effective guiding action. It is possible to envisage actuating surfaces of the keeper and the bolt having a shape different from that which has been described.

It is also possible to imagine other embodiments of the operating assembly and other elastic return means for this operating assembly and the movable part of the armrest.

One could also imagine a simplified device not having any spring for the return of the armrest into the lowered position. After being unlocked, the armrest could be lowered manually in this case. One could also imagine a spring for the return of the armrest towards its raised position, instead of towards its lowered position.

The invention applies preferably to the fittings of any motor vehicle, but it could also apply to the fittings of other land, sea and air transportation means and even, more generally, to any seat provided with an armrest.

I claim:

1. Armrest, in particular a front central armrest of a motor vehicle comprising a movable part consisting of a frame covered by padding mounted pivotably about a horizontal hinging pin so as to be able to be moved between two stable positions, namely a lowered position where the movable part is substantially horizontal and a raised position where it is substantially vertical, in which the horizontal hinging pin is integral with the structure of the vehicle comprises a keeper of annular shape arranged coaxially relative to the hinging pin having a profiled active surface along an annular edge at one of its front ends, around the hinging pin, and in that the movable part comprises an operating assembly consisting of a support mounted slidably on the frame in the axial direction XX' carrying a bolt of annular shape mounted slidably on the hinging pin and having a profiled active surface along an annular edge capable of cooperating with the active surface of the keeper in order to lock the part movable in rotation in its vertical position and place this movable part in abutment downwards in its horizontal position and an operating button accessible on a lateral side of the armrest for axial displacement of the support and of the bolt by means of pushing, in order to perform unlocking of the movable part in the vertical position, by separation of the bolt and of the keeper, elastic return means being inserted between the operating assembly and the frame, so as to ensure the return of the bolt towards the keeper, wherein the active surface of the bolt consists of a peripheral surface of at least one finger axially projecting on one of the front faces of the bolt and in that the corresponding active surface of the keeper comprises at least one notch, the shape of which corresponds to that of the finger set back in the axial direction relative to the front surface of the keeper, a bearing surface forming a stop for the finger substantially parallel to the axial direction XX' and a ramp joining the notch to the bearing surface.

2. Armrest according to claim 1, wherein the support of the operating assembly consists of at least two axially directed parallel rods integral at one of their ends with the bolt and at their other end with the operating button.

3. Armrest according to claim 1, wherein it comprises furthermore an elastic return means ensuring the return of the movable part from its raised position towards its lowered position.

4. Armrest according to claim 1, wherein the notch is delimited at least partially by a part of the peripheral surface of a finger axially projecting relative to the front face of the keeper, a part of the peripheral surface of the finger forming the bearing surface.

5. Armrest according to claim 1, wherein the ramp joining the notch to the bearing surface comprises an end part, in the vicinity of the bearing surface directed such that, when the bolt moves in contact with this part of the ramp in the direction of the bearing surface, during rotational displacement of the movable part, the operating assembly is displaced in the axial direction against the elastic return means.

6. Armrest according to claim 1, wherein the bolt comprises two fingers arranged substantially at 180° around its axis and in that the active surface of the keeper comprises two notches and two bearing and stopping surfaces arranged substantially at 180° around the geometric axis XX' of the hinging pin.

7. Armrest according to claim 1, wherein the support of the operating assembly consists of three rods arranged substantially at 120° around the axis of rotation XX' of the armrest and joined at one of their ends to a place comprising a central opening inside which the bolt is fixed, and engaged and clipped by their other ends into seats in the button, helical springs being arranged around the rods and inserted between the stopper and a bearing surface of the frame.

8. Armrest according to claim 1, wherein the operating button and corresponding ends of rods are arranged inside a cavity formed laterally inside the frame of the armrest.

9. Armrest according to claim 1, wherein the hinging pin is made in tubular form.

10. Armrest according to claim 1, forming a front central armrest of a motor vehicle arranged between the driver's seat and the front passenger seat, wherein the hinging pin is fixed on the bottom part of the edge of the backrest of the driver's seat.

* * * * *